(12) United States Patent
Yin et al.

(10) Patent No.: US 8,837,359 B2
(45) Date of Patent: Sep. 16, 2014

(54) LOCATION INTERCEPT METHOD AND APPARATUS

(75) Inventors: Yu Yin, Shenzhen (CN); Qing Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 12/956,825

(22) Filed: Nov. 30, 2010

(65) Prior Publication Data

US 2011/0069664 A1 Mar. 24, 2011

Related U.S. Application Data

(63) Continuation of application No. PCT/CN2009/071958, filed on May 25, 2009.

(30) Foreign Application Priority Data

Jun. 11, 2008 (CN) .......................... 2008 1 0114630

(51) Int. Cl.
*H04W 4/00* (2009.01)
*H04W 60/00* (2009.01)
*H04W 64/00* (2009.01)

(52) U.S. Cl.
CPC ............. *H04W 60/00* (2013.01); *H04W 64/00* (2013.01)
USPC ........... 370/328; 370/337; 370/338; 455/433; 455/458; 455/515

(58) Field of Classification Search
USPC ......................................................... 370/328
See application file for complete search history.

(56) References Cited

U.S. PATENT DOCUMENTS

| | | | | |
|---|---|---|---|---|
| 5,875,400 A | * | 2/1999 | Madhavapeddy et al. | 455/458 |
| 6,584,314 B1 | * | 6/2003 | Haumont et al. | 455/435.1 |
| 8,271,001 B2 | * | 9/2012 | Yin et al. | 455/458 |
| 2006/0206941 A1 | * | 9/2006 | Collins | 726/25 |
| 2007/0104156 A1 | * | 5/2007 | Inoue et al. | 370/338 |

FOREIGN PATENT DOCUMENTS

| | | |
|---|---|---|
| CN | 1458754 A | 11/2003 |
| CN | 1592211 A | 3/2005 |
| CN | 1684425 A | 10/2005 |
| CN | 1722894 A | 1/2006 |
| CN | 1758659 A | 4/2006 |

(Continued)

OTHER PUBLICATIONS

3GPP TSG SA WG2 Meeting #59, S2-073219 by Mitsubishi Electric, Aug. 31, 2007.*

(Continued)

*Primary Examiner* — Ayaz Sheikh
*Assistant Examiner* — Hai-Chang Hsiung
(74) *Attorney, Agent, or Firm* — Brinks Gilson & Lione

(57) ABSTRACT

The present disclosure discloses a location monitoring method and apparatus. The method includes: creating a tracking area (TA) list for user equipment (UE) according to a monitoring precision indication and sending the TA list to the UE; and obtaining location information of the UE when the UE executes a location update according to the TA List and reporting the location information to a monitoring center. With the present disclosure, the monitoring location precision of a monitoring target may be set so that more accurate location information of the monitoring target can be obtained and that the needs of various monitoring tasks can be satisfied.

9 Claims, 5 Drawing Sheets

(56) References Cited

FOREIGN PATENT DOCUMENTS

| CN | 101009943 A | 8/2007 |
|---|---|---|
| CN | 101127159 A | 2/2008 |
| CN | 101128051 A | 2/2008 |
| CN | 101605338 B | 4/2011 |
| EP | 2034791 A1 * | 3/2009 |
| WO | WO 99/31917 A2 | 6/1999 |
| WO | 2005/074355 A2 | 8/2005 |

OTHER PUBLICATIONS

3GPP TSG RAN WG3 Meeting #50, R3-060049 by Ericsson, Jan. 12, 2006.*

International Search Report issued in corresponding PCT Application No. PCT/CN2009/071958; mailed Sep. 3, 2009.

Office Action issued in corresponding European Patent Application No. 09761263.4, mailed Dec. 14, 2011.

Extended European Search Report issued in corresponding European Patent Application No. 09761263.4, mailed Jun. 20, 2011,.

Written Opinion of the International Searching Authority issued in corresponding PCT Patent Application No. PCT/CN2009/071958, mailed Sep. 3, 2009.

Mitsubishi Electric, "Self-Optimization of Assigned TA List From Reported List of Last Visited TAs" 8.2.5, 3GPP TSG SA WG2 Meeting #59, Helsinki, Finland, Aug. 27-31, 2007.

Yimu et al., "Application Study on Grid Technique Used in Telecommunication", China Academic Journal Electronic Publishing House. http://cnki.net.

Office Action issued in corresponding European Patent Application No. 09761263.4, mailed Oct. 15, 2012.

Catt, "TA List Allocation and Old TA Identity Selection" Agenda Item 8.2.5, 3GPP TSG SA WG2 Architecture—S2#59. Helsinki, Finland, Aug. 27-31, 2007. S2-073221.

* cited by examiner

LOCATION INTERCEPT METHOD AND APPARATUS

CROSS-REFERENCE TO RELATED APPLICATIONS

This application is a continuation of International Application No. PCT/CN2009/071958, filed on May 25, 2009, which claims priority to Chinese Patent Application No. 200810114630.6, filed on Jun. 11, 2008, both of which are hereby incorporated herein by reference in their entireties.

FIELD OF THE DISCLOSURE

The present disclosure relates to communications technologies, and in particular, relates to a location monitoring method and apparatus.

BACKGROUND OF THE DISCLOSURE

To protect national and public security and interests, under the authorization of law, the national security authority must implement lawful monitoring via public communications networks. For description purposes, lawful monitoring herein is described as monitoring. A monitoring system generally consists of a monitoring center and network elements. Network elements are communications devices providing communications services for users in a communications network (or network devices), such as a program controlled switch, a mobile switching center server (MSC server) in a mobile circuit switched network, and a gateway (GW). The monitoring center is an entity that receives monitoring commands from the national security authority and receives monitoring target related information reported by network elements.

An important function of monitoring is to monitor the current location of a monitoring target. When the location of the monitoring target changes, a network device must report the current location information of the monitoring target to the monitoring center. In an evolved packet system (EPS), a concept of tracking area (TA) and a TA list technique are adopted. A TA is a division of a radio coverage area. When an EPS allocates page areas for user equipment (UE, which is a monitoring target), the EPS may combine one or more adjacent TAs to a TA list and send the list to the monitoring target. The current TA of the monitoring target is included in the newly allocated TA list. When the monitoring target is idle, its location update is based on the TA list. When the monitoring target moves from a TA in the TA list to a TA outside the TA list (or when a periodic location update timer expires), the monitoring target will initiate a location update procedure and notify the network of its location.

During the implementation of the present disclosure, the inventor finds at least the following problem in the prior art:

When the monitoring target moves inside a TA, or moves from one TA in a TA list to another TA in the TA list, the monitoring target does not notify the network of the change of its location. As a result, the EPS network is unable to know more accurate location information of the monitoring target and the monitoring system is unable to obtain a continuous moving track of the monitoring target or the moving direction, distance and speed information of the monitoring target.

SUMMARY OF THE DISCLOSURE

Embodiments of the present disclosure provide a location monitoring method and apparatus so that a monitoring system can improve the monitoring location precision in an EPS.

A location monitoring method includes: obtaining, in an EPS, first location information of a UE performing a location update before the location update and second location information after the location update and reporting the first location information and the second location information to a monitoring center.

A location information obtaining apparatus applied in an EPS includes: a location information obtaining unit and a reporting unit. The location information obtaining unit is configured to obtain first location information of a UE performing a location update before the location update and second location information after the location update; the reporting unit is configured to report the location information obtained by the location information obtaining unit to a monitoring center.

A location information receiving apparatus includes: a location information receiving unit and a location information processing unit. The location information receiving unit is configured to obtain first location information of a UE performing a location update before the location update and second location information after the location update; The location information processing unit is configured to obtain location update information of the UE according to the first location information of the UE before the location update and the second location information after the location update obtained by the location information receiving unit.

A location monitoring method includes: creating a TA list according to a monitoring precision indication and sending the TA List to a UE; and obtaining location information of the UE when the UE executes a location update according to the TA list and reporting the location information to a monitoring center.

A location management apparatus includes: a listing unit configured to create a TA list for a UE according to a monitoring precision indication and send the TA list to the UE; a location information obtaining unit configured to obtain location information of the UE when the UE executes a location update according to the TA list; and a reporting unit configured to report the location information obtained by the location information obtaining unit to a monitoring center.

A location information receiving apparatus includes: a monitoring precision indicating unit configured to send a monitoring precision indication for creating a TA list of a UE according to a required monitoring precision; a location information receiving unit configured to obtain location information of the UE when the UE executes a location update according to the TA list; and a location information processing unit configured to obtain location update information of the UE according to the location information obtained by the location information receiving unit when the UE executes the location update.

In the embodiments of the present disclosure, a TA list of the UE is created according to a monitoring location precision indication so that the monitoring location precision of a monitoring target can be set and thereby more accurate location information of the monitoring target can be obtained. For example, the TA list of the UE may include only one TA and the location precision of the UE is an individual TA. By obtaining the first location information of the UE before the location update and the second location information after the location update, the monitoring center knows the moving direction and distance of the monitoring target and the moving track of the monitoring target with the location precision of TAs, and further knows the moving speed of the monitoring target. Therefore, the embodiments of the present disclosure can meet the needs of various monitoring tasks.

DETAILED DESCRIPTION OF THE DISCLOSURE

In the embodiments of the present disclosure, to obtain more accurate location information of a monitoring target in an EPS network, a location monitoring method is provided. The method includes: when a UE performs a location update, obtaining first location information of the UE before the location update and second location information of the UE after the location update and reporting the first location information and the second location information to a monitoring center. Thus, the monitoring center knows the locations of the monitoring target before and after the move and further determines the continuous moving track with respect to TAs and the moving direction, distance and speed of the monitoring target.

To help understand the present disclosure, the embodiments of the present disclosure will be described in detail with reference to the accompanying drawings.

Figure 1:
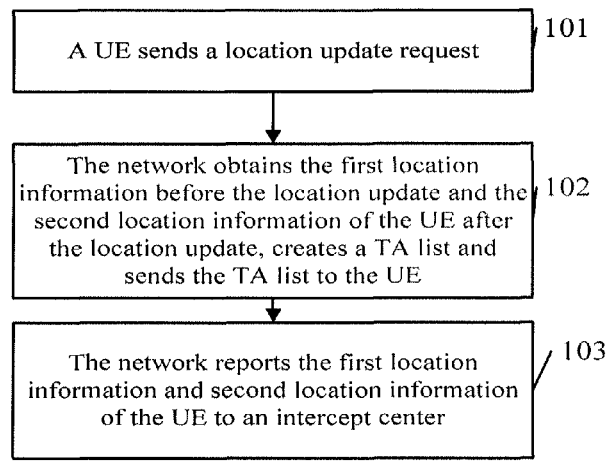
FIG. 1 is a schematic diagram of a method provided in an embodiment of the present disclosure.

FIG. 1 is a schematic diagram of the method provided in an embodiment of the present disclosure. The method includes the following steps:

Step 101: A UE sends a location update request. In particular, when the UE detects that it enters a tracking area (TA) not within the last allocated TA list, the UE sends a location update request. Assume that the TA list of the UE includes 8 TAs (TA1, TA2, TA3, . . . , TA8). When the UE moves within the 8 TAs, the UE will not initiate a location update procedure (unless the periodic location update timer expires). When the UE moves from TA8 to TA9, however, because TA9 is not included in the TA list, the UE will initiate a location update. In addition, even if the UE moves within the TA list or the UE stays in one location, for example, the location of the last location update of the UE is TA2 and the location of the UE is still TA2 when the periodic location update timer expires, the UE will also initiate a location update.

Step 102: The network receives the update location request of the UE and obtains the first location information of the UE before the location update and the second location information of the UE after the location update.

When the UE sends a location update request upon detecting that the new TA is not included in the last allocated TA list, the first location information is an ID of the TA where the UE is located before the move and the second location information is the ID of the TA where the UE is located after the move.

Or, when the UE sends a periodic location update request while moving within TAs in the last allocated TA list, the first location information is an ID of the TA where the UE is located before the move and the second location information is the ID of the TA where the UE is located after the move.

Or, when the UE sends a periodic location update request while the UE moves or stays in a TA in the last allocated TA list, the first location information and the second location information are the ID of the TA.

When the network receives the location update request of the UE, the network obtains the first location information before the location update and the second location information after the location update, executes the location update of the UE according to the location update request, creates a new TA list of the UE, and sends the new TA list to the UE.

In practice, the last visited TA carried in the location update request of the UE may be the first location information. For example, when the UE moves from TA8 to TA9, the last visited TA is the ID of TA8. If the location of the UE is TA2 and the location when the periodic location update timer expires is still TA2, the last visited TA is the ID of TA2. The current TA of the UE may be the second location information. For example, the current TA may be the cell ID where the UE is located when a processing unit of the network receives the location update request of the UE. If the UE moves from TA8 to TA9, the current TA is the ID of TA9; if the UE does not move where the last location is TA2 and the location when the periodic location update timer expires is still TA2, the current TA is the ID of TA2. The location update request of the UE may carry the current TA.

Step 103: The network reports the obtained first location information and second location information of the UE to a monitoring center. Further, the network may report the TA list currently allocated for the UE to the monitoring center.

In the above embodiment of the present disclosure, the location information before and after the move of a UE is delivered to the monitoring center via the first location information before the location update and the second location information after the location update provided by the UE. The monitoring center may determine the continuous moving track with respect to TAs and the moving direction, distance and speed of the monitoring target according to the location information and the monitoring center knows that the moving range of the monitoring target before the next location update is within the new TA list.

The prior art does not specify how the EPS network reports the location information of a UE to the monitoring center. If compared with a general packet radio service (GPRS) network, the EPS network will report the TA list. This means the prior art is based on the reporting of a TA list to the monitoring center. For example, the TA list of the UE includes 8 TAs (TA1, TA2, TA3, . . . , TA8). When the periodic location update timer expires, the UE initiates a location update. Assume that the UE does not move during the period and the location is always TA2. The location information reported to the monitoring center in the prior art is the TA list, which includes 8 TAs (TA1, TA2, TA3, . . . , TA8). In the embodiment of the present disclosure, the first location information and the second location information reported to the monitoring center are both TA2. Compared with the TA list provided in the prior art, the location information TA2 provided in the embodiment of the present disclosure is more accurate.

Further, in practice, when the UE moves within the 8 TAs in the TA list, from TA2 to TA3 and from TA3 to TA4, if the periodic location update timer expires, and the UE initiates a location update, the first location information reported to the monitoring center is TA3 and the second location information is TA4 in the embodiment of the present disclosure. According to the location information of the two reports, the monitoring center can determine that the latest moving direction of the UE is from TA2 to TA3 and then to TA4. In the prior art, however, the location information reported to the monitoring center is the TA list which includes the 8 TAs (TA1, TA2, TA3, . . . , TA8) and therefore the monitoring center cannot determine whether the UE moves during the period.

Further, assume the UE moves again, for example, from TA4 to TA9, because TA9 is not included in the TA list, the first location information reported to the monitoring center is TA4 and the second location information is TA9 in the embodiment of the present disclosure. According to the location information in the three reports, the monitoring center may determine that the latest moving direction of the UE is from TA2 to TA3, then to TA4, and then to TA9. In this case, the network also sends a new TA list for the UE in the embodiment of the present disclosure. For example, the new TA list also includes 8 TAs (TA4, TA5, TA6, . . . , TA11). When the UE moves from TA4 to TA9, the location information reported to the monitoring center in the prior art is the new TA list which includes 8 TAs (TA4, TA5, TA6, . . . , TA11). Therefore, in the prior art, the monitoring center can only determine that the UE moves but cannot determine how the UE moves in the period.

Figure 2:
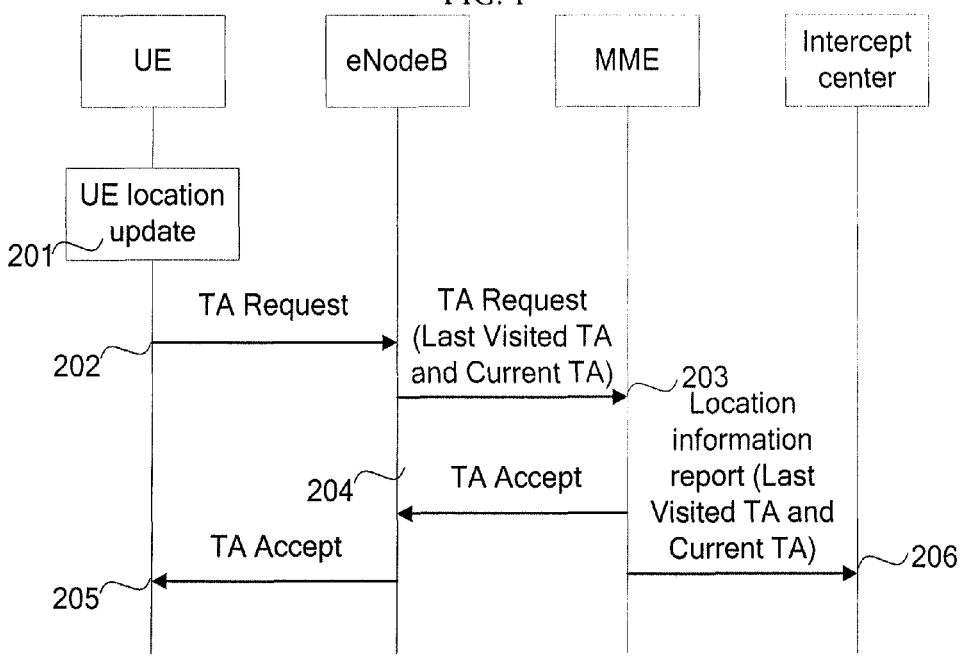
FIG. 2 is a schematic diagram of an application procedure in an embodiment of the present disclosure.

An application procedure of the embodiment of the present disclosure will be described in detail with reference to FIG. 2. In FIG. 2, the UE is a terminal; the evolved NodeB (eNodeB) receives information of the UE and sends information to the UE; the mobility management entity (MME) obtains the location information of the UE before and after a location update and reports the location information to a monitoring center.

Step 201: The UE detects a newly entered TA is not in the last allocated TA list and initiates a location update. In practice, the UE may initiate a location update when a periodic location update timer expires.

Step 202: The UE sends a location update request (TA request) which carries the first location information (last visited TA) to the eNodeB. The request may carry the second location information.

Step 203: Upon reception of the TA request, if the eNodeB finds that the request does not carry the second location information, the eNodeB regards the area ID (such as a cell ID) of the location where the location update request is received as the second location information (current TA), inserts the current TA in the TA request, and sends the request to the MME.

Step 204: The MME receives the TA request that carries the last visited TA and the current TA, executes the location update of the UE, and sends a location update response indicating acceptance of the TA request (TA Accept) to the eNodeB. The TA Accept message carries a TA list created for the UE.

Step 205: The eNodeB forwards the received TA Accept message to the UE.

Step 206: The MME reports the last visited TA, current TA and the new TA list to the monitoring center. The monitoring center may determine the continuous moving track with respect to TAs, and the moving direction, distance and speed of the monitoring target according to the received location information and the monitoring center knows that the moving range of the monitoring center before the next location update is within the new TA list. Therefore, the embodiment of the present disclosure is applicable to processes of obtaining a moving track of a UE in particular service scenarios, such as capturing.

It should be noted that in the second location information after the location update in the embodiment of the present disclosure, "after the location update" is only a modifier of the second location information but does not limit the time of obtaining the second location information. The second location information may be obtained during the location update. For example, the MME may report location information to the monitoring center before step 204 or report the location information after step 204. This means that, after the MME obtains the location information, the MME may send the location information of the UE to the monitoring center before responding to the TA request.

An embodiment of the present disclosure provides another location monitoring method. In the embodiment, the network creates a TA list for a UE according to a monitoring precision indication which decides TAs in the TA list, sends the TA list to the UE, and obtains the location information of the UE when the UE executes a location update according to the TA list, and reports the location information to the monitoring center.

Specifically, upon reception of the location update request from the UE, the network creates a TA list for the UE according to the monitoring precision indication.

To help understand the present disclosure, an implementation of the method provided in the embodiment of the present disclosure will be described in detail with reference to the accompanying drawing.

Figure 3:
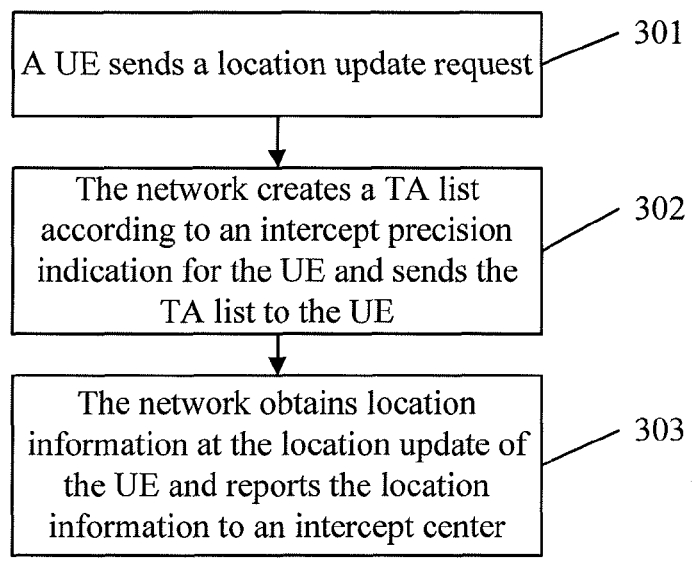
FIG. 3 is a schematic diagram of another method provided in an embodiment of the present disclosure.

FIG. 3 shows a procedure of another method in an embodiment of the present disclosure. The procedure includes the following steps:

Step 301: A UE detects that a newly entered TA is not in the last allocated TA list and sends a location update request. In practice, the UE may initiate a location update when a periodic location update timer expires.

Step 302: Upon reception of the location update request, the network creates a TA list for the UE according to a monitoring precision indication and sends the TA list to the UE. In practice, the network may create the TA list for the UE when the reallocation of a UE identity is initiated after obtaining the monitoring precision indication. The monitoring precision indication includes at least one of the following items: monitoring target information of the UE, monitoring level information of the UE, and monitoring location precision information of the UE. For example, the monitoring target information of the UE may indicate whether the UE is a monitoring target; the monitoring level information of the UE may indicate whether high precision location information or common precision location information of the UE is requested; the monitoring location precision information of the UE indicates the required precision of the location information; for example, if the precision requirement in the information is 1 km, the precision of the reported location information of the UE is within 1 km.

Step 303: When the UE initiates a location update (including a periodic location update) according to the TA list sent in step 302, the network obtains location information of the UE at the time of the location update, including the first location information before the location update and the second location information after the location update, or the network obtains only the second location information of the UE after the location update, and reports the obtained location information to the monitoring center; then the network creates a new TA list and sends the new TA list to the UE. For example, the TA list allocated for the UE in step 302 includes only TA1 and TA2. When the network receives a location update request sent by the UE when the UE moves from TA2 to TA3 and finds that TA3 is not included in the TA list, the network executes an appropriate location update procedure and obtains the first location information (last visited TA: TA2) before the location update and the second location information (current TA: TA3) after the location update of the UE and reports the first location information and the second location information and the new TA list of the UE to the monitoring center.

In the above procedure of the method, the network creates a TA list for the UE according to the monitoring location precision indication and thereby may set the monitoring location precision of a monitoring target and obtain more accurate location information of the monitoring target. For example, if one TA is set in the TA list, the location precision of the UE is an individual TA. In practice, the network may obtain only the second location information of the UE after the location update when obtaining location information of the UE at the time of the location update and reports the second location information to the monitoring center. The implementation is similar to the above description and therefore omitted.

Figure 4:
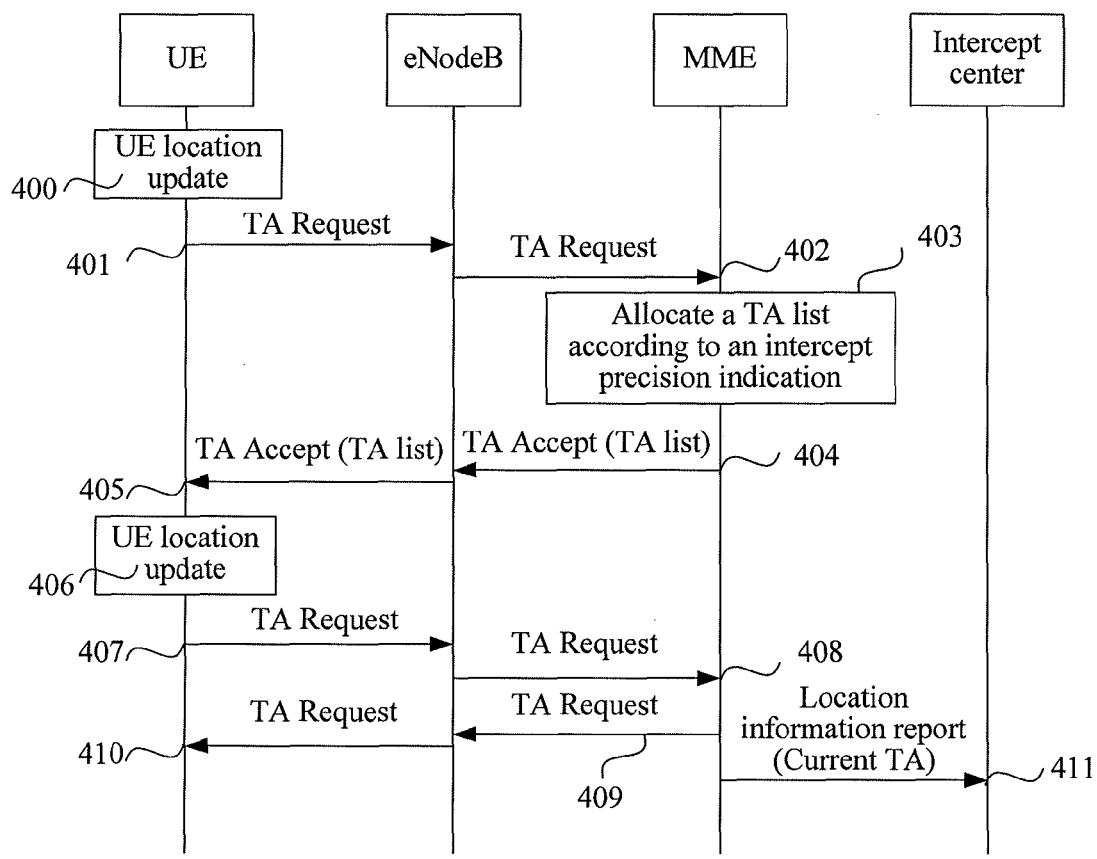
FIG. 4 is a schematic diagram of another application procedure in an embodiment of the present disclosure.

Another application procedure of the embodiment of the present disclosure will be described in detail with reference to FIG. 4. As shown in FIG. 4, the procedure includes the following steps:

Step 400: A UE detects that the current TA is not in its TA list and initiates a location update. In practice, the UE may initiate the location update when the periodic location update timer expires.

Step 401: The UE sends a TA request to an intermediate device eNodeB.

Step 402: The eNodeB receives the TA request and forwards the TA request to the network device MME.

Step 403: Upon reception of the TA request, the MME creates a TA list according to a monitoring precision indication of the UE. In practice, the monitoring precision indication of the UE may be stored in the MME or obtained by the MME instantly. The MME may obtain the monitoring precision indication in the following approaches:

- interact with a home subscriber server (HSS) that stores the monitoring precision indication of the UE to obtain the monitoring precision indication of the UE; or
- interact with the monitoring center to obtain the monitoring precision indication of the UE; or
- obtain the monitoring precision indication of the UE preconfigured in the local information, which may be stored in the local information after the MME obtains the monitoring precision indication of the UE from the HSS or monitoring center and obtained from the local information when the monitoring precision indication of the UE is requested.

Further, after obtaining the monitoring precision indication, when the MME creates a TA list for the UE according to the monitoring precision indication, the MME performs at least one of the following processing actions:

According to the monitoring target information of the UE, if the UE is a monitoring target, the MME creates a TA list of at least one TA that includes the current TA of the UE; if the UE is not a monitoring target, the MME may create a TA list of the UE according to the current TA of the UE and surrounding TAs. For example, if the UE is a monitoring target, the MME creates a TA list that includes only the current TA of the UE; if the UE is not a monitoring target, the MME creates a TA list for the UE in common mode, for example, placing 10 adjacent TAs in one TA list.

According to the monitoring level information of the UE, the MME may choose the number of TAs corresponding to the monitoring level and create a TA list according to the chosen number of TAs and according to the current TA of the UE and surrounding TAs. For example, if the monitoring level of the UE is high, the MME creates a TA list that includes only the current TA of the UE; if the monitoring level of the UE is middle, the MME creates a TA list that includes 3 TAs for the UE; if the monitoring level of the UE is low, the MME creates a TA list that includes 6 TAs for the UE.

According to the monitoring location precision information of the UE, the MME may choose the number of TAs corresponding to the monitoring location precision and create a TA list for the UE according to the chosen number and according to the current TA of the UE and surrounding TAs. For example, according to the configuration and planning of TAs, for a UE with a monitoring precision of lower than 500 m, the MME creates a TA list that includes only the current TA of the UE; if the monitoring precision is between 500 m and 1 km, the MME creates a TA list that includes the current TA of the UE and 6 adjacent TAs, altogether 7 TAs.

Assume that the TA list created by the MME for the UE in the step includes 3 TAs (TA8, TA9 and TA10).

In addition to creating a TA list for the UE according to the monitoring precision indication after receiving the TA request of the UE, the MME may create a TA list for the UE according to the monitoring precision indication when a UE identity reallocation procedure such as a globally unique temporary UE identity (GUTI) reallocation procedure is initiated.

Step 404: The MME executes the location update of the UE and sends a TA Accept message to the eNodeB. The TA Accept message carries the TA list created in step 403.

If, in step 403, the MME creates a TA list for the UE according to the monitoring precision indication when initiating a GUTI reallocation procedure, the MME may send a GUTI Reallocation Command to the eNodeB. The GUTI Reallocation Command carries the TA list created in step 403.

Step 405: The eNodeB forwards the received TA Accept message or GUTI Reallocation Command to the UE.

Step 406: After receiving the TA list that includes 3 TAs (TA8, TA9, and TA10), the UE moves to TA11 and initiates another location update procedure. It should be noted that, when the UE moves in TA8, TA9, and TA10, the UE will not initiate a location update. However, when the UE moves within the 3 TAs and the periodic location update timer expires, although the UE is still within a TA in the TA list, for example, the last move is from TA9 to TA10, the UE will initiate a location update; even if the UE does not move, for example, the location of the UE at the time of the last location update is TA9 and the location of the UE is still TA9 when the periodic location update timer expires, the UE will also initiate a location update procedure.

Step 407: The UE sends a TA request to the eNodeB. The TA request may carry the first location information (last visited TA) and the second location information after the location update (current TA) of the UE or carry only the last visited TA. For example, if the UE moves from TA10 to TA11, the last visited TA is TA10 and the current TA is TA11; if the location of the UE when the last location update is initiated is TA9 and, the location of the UE is still TA9 when the periodic location update timer expires, the last visited TA is TA9.

Step 408: When the eNodeB forwards the TA request to the MME, if the TA request does not carry the current TA, the eNodeB inserts the current TA in the TA request. For example, when the UE moves from TA9 to TA8, the current TA is TA8; if the location of the UE when the last location update is initiated is TA9 and the location of the UE is still TA9 when the periodic location update timer expires, the current TA is TA9.

Step 409: After receiving the TA request, the MME executes the location update of the UE and sends a TA Accept message to the eNodeB. The TA Accept message carries a new TA list created for the UE (the current TA of the UE is also included in the TA list).

Step 410: The eNodeB forwards the TA Accept message in step 409 to the UE.

Step 411: The MME obtains the first location information and the second location information of the UE and reports the location information to the monitoring center. Further, a location information obtaining unit may report the TA list currently allocated for the UE to the monitoring center. It should be noted that step 411 may be executed before or after step 409.

Through the above application procedure, the MME may determine whether the UE is a monitoring target according to the monitoring target information of the UE and determine whether it should provide high precision location information or common precision location information of the UE according to the monitoring level information of the UE; according to the monitoring location precision information of the UE, the precision of the location information of the UE may be set in a certain range. For example, if the precision required in the information is 1 km, the precision of the location information of the UE is within 1 km. Thus, more accurate location information of the monitoring target may be obtained.

Figure 5:
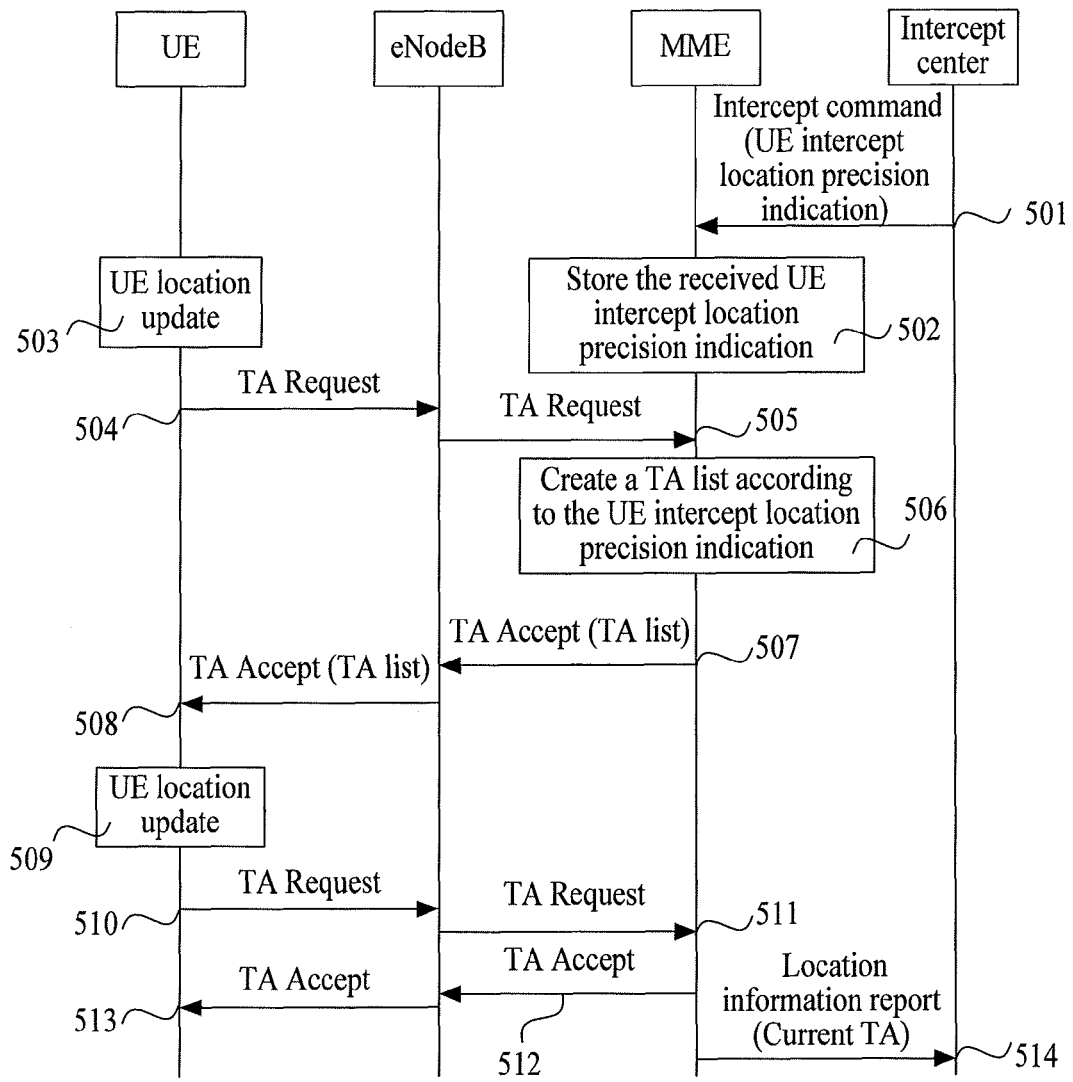
FIG. 5 is a schematic diagram of a procedure where the monitoring center sends a monitoring target precision indication in an embodiment of the present disclosure.

FIG. 5 shows a procedure where the monitoring center sends the monitoring target precision indication in an embodiment of the present disclosure. The procedure includes the following steps:

Step 501: When the monitoring center needs to monitoring a UE, the monitoring center sends a monitoring command to the MME. The monitoring command carries the location precision indication of the monitoring target. The location precision indication of the monitoring target may include the monitoring target information of the UE, monitoring level information of the UE, and monitoring location precision information of the UE. The monitoring command may carry no additional information but carries the location precision indication of the monitoring target implicitly to indicate that the current UE must be monitoringed and that the MME needs to provide the default location precision information of the UE.

Step 502: The MME receives the monitoring command and stores information of the monitoring command.

Step 503: The UE detects that the current TA is not in the TA list and initiates a location update or initiates a periodic location update.

Steps 504-514 are the same as the procedure shown in FIG. 4 and omitted here.

In the above procedure, the MME creates a TA list for the UE according to a monitoring location precision indication. Thus, the monitoring location precision of a monitoring target can be set. In practice, because it is not necessary to always monitor all monitoring targets with a high location precision, the monitoring center may send different UE (user) monitoring precision indications according to the monitoring task. For example, to monitoring a common user, the monitoring center may only need to know the approximate location of the UE and can indicate a low monitoring level of the UE in the sent monitoring location precision indication. To hunt a suspect, the monitoring center needs to know the most accurate location of the user and can indicate a high monitoring level of the UE in the sent monitoring location precision indication.

In practice, the method may be applied to all kinds of networks, including the EPS.

Figure 6:
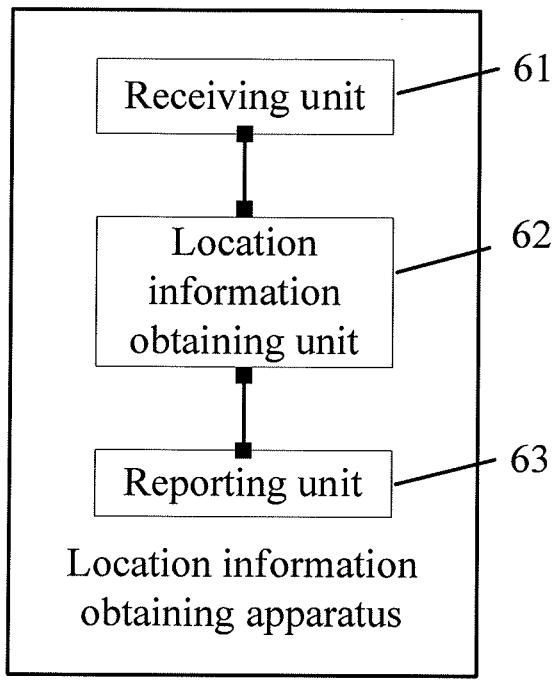
FIG. 6 shows a structure of a location information obtaining apparatus provided in an embodiment of the present disclosure.

An embodiment of the present disclosure provides a location information obtaining apparatus which can be applied in an EPS network, for example, placed in the MME. A structure of the apparatus is shown in FIG. 6, including a receiving unit 61, a location information obtaining unit 62, and a reporting unit 63.

The receiving unit 61 is configured to receive a location update request of a UE.

The location information obtaining unit 62 is configured to obtain the first location information of the UE before the location update and the second location information after the location update and send the obtained location information to a reporting unit 63. For example, after the receiving unit 61 receives the location update request of the UE, the location information obtaining unit 62 obtains the first location information and the second location information carried in the location update request; and the location information obtaining unit 62 is further configured to: execute the location update procedure of the UE according to the location update request of the UE, create a TA list for the UE and send the TA list to the reporting unit 63.

The reporting unit 63 is configured to report the first location information and the second location information obtained by the location information obtaining unit 62 and the TA list created for the UE to the monitoring center.

The location information obtaining apparatus may obtain the location information before and after the UE moves and send the location information to the monitoring center and the monitoring center may determine the continuous moving track with respect to TAs and the moving direction, distance and speed of the monitoring target according to the location information. The monitoring center also knows that the moving range of the monitoring target before the next location update is within the new TA list. Thus, the location precision of the monitoring target is improved.

Figure 7:
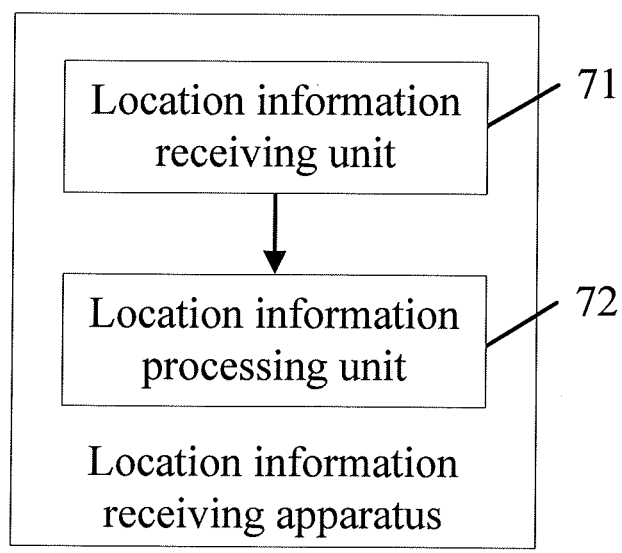
FIG. 7 shows a structure of a location information receiving apparatus provided in an embodiment of the present disclosure.

An embodiment of the present disclosure provides a location information receiving apparatus which can be applied in, for example, an EPS network. In practice, the apparatus may be placed in a monitoring center. A structure of the location information receiving apparatus is shown in FIG. 7, including a location information receiving unit 71 and a location information processing unit 72.

The location information receiving unit 71 is configured to obtain the first location information of a UE before a location update and the second location information after the location update, for example, receive the location information of the UE before and after the location update reported by the MME and the new TA list of the UE.

The location information processing unit 72 is configured to obtain the location update information of the UE according to the first location information of the UE before the location update and the second location information after the location update obtained by the location information receiving unit 71. The location update information may include the continuous moving track with respect to TAs and the moving direction, distance and speed of the UE. For example, the location information processing unit 72 determines the continuous moving track with respect to TAs and the moving direction, distance and speed of the UE according to the received location information.

Figure 8:
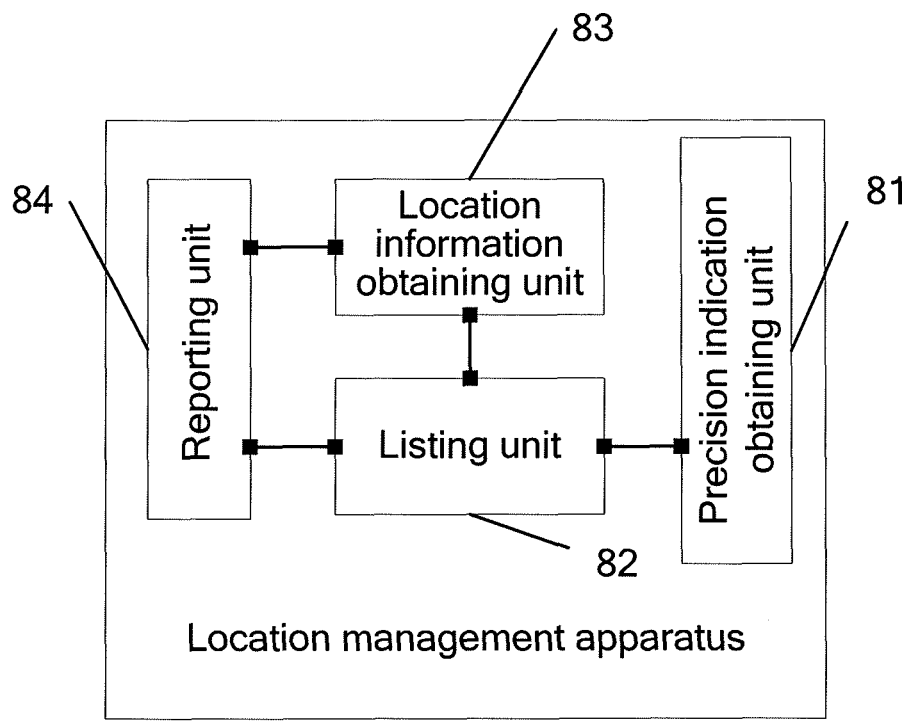
FIG. 8 shows a structure of a location management apparatus provided in an embodiment of the present disclosure.

An embodiment of the present disclosure provides a location management apparatus which may be placed in the MME. A structure of the apparatus is shown in FIG. 8, including a precision indication obtaining unit 81, a listing unit 82, a location information obtaining unit 83, and a reporting unit 84.

The precision indication obtaining unit 81 is configured to obtain a monitoring precision indication and send the monitoring precision indication to a listing unit 82. Specifically, the precision indication obtaining unit 81 interacts with an HSS that stores the monitoring precision indication of the UE to obtain the monitoring precision indication of the UE; or interacts with the monitoring center to obtain the monitoring precision indication of the UE; or obtains the monitoring precision indication of the UE preconfigured in the local information, including storing the monitoring precision indication of the UE obtained from the HSS or monitoring center in the local information and obtaining the monitoring precision indication from the local information when the monitoring precision indication of the UE is requested.

The listing unit 82 is configured to create a TA list for the UE according to the monitoring precision indication obtained by the precision indication obtaining unit 81 and send the TA list to the UE. For example, the listing unit 82 may create the TA list for the UE according to the monitoring precision indication when initiating a UE identity reallocation procedure or after receiving a location update request from the UE.

The location information obtaining unit 83 is configured to obtain the location information of the UE when the UP executes the location update according to the TA list, including obtaining the first location information (last visited TA) of the UE before the location update and the second location information (current TA) after the location update and reporting the obtained location information to the reporting unit 84. For example, after receiving the location update request sent by the UE when the UE detects a newly entered TA is not in the last allocated TA list, if the location update request carries the first location information and the second location information, the location information obtaining unit 83 obtains the first location information and the second location information; if the location update request carries the first location information but not the second location information, the location information obtaining unit 83 regards the area ID of the location where the location update request is received as the second location information and obtains the first location information and the second location information.

The reporting unit 84 is configured to report the location information obtained by the location information obtaining unit 83 and the TA list created by the listing unit 82 to the monitoring center.

In practice, the above location management apparatus can improve the location precision of the monitoring target. For example, when receiving the location update request from the UE, the location information obtaining unit 83 notifies the listing unit 82 of the location information and the listing unit 82 may create a TA list for the UE according to the monitoring precision indication of the UE obtained by the precision indication obtaining unit 81 and send the TA list to the UE. When the UE detects that a newly entered TA is not in the TA list, the UE initiates a location update and the location information obtaining unit 83 obtains the first location information (last visited TA) before the current location update and the second location information (current TA) and reports the obtained information and the TA list of the UE to the reporting unit 84. The reporting unit 84 reports the information and the TA list to the monitoring center.

Figure 9:
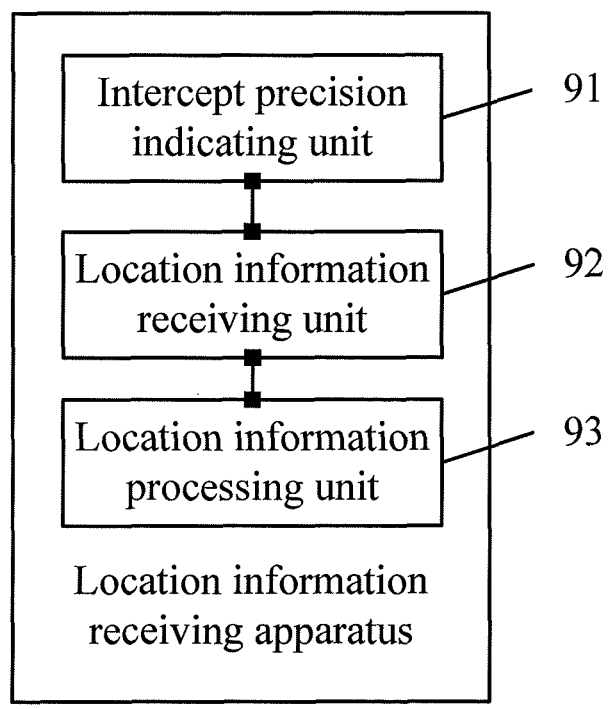
FIG. 9 shows a structure of another location information receiving apparatus provided in an embodiment of the present disclosure.

An embodiment of the present disclosure provides another location information receiving apparatus which may be placed in the monitoring center. A structure of the apparatus is shown in FIG. 9, including a monitoring precision indicating unit 91, a location information receiving unit 92, and a location information processing unit 93.

The monitoring precision indicating unit 91 is configured to send the monitoring precision indication for creating the TA list of the UE according to the required monitoring precision; the monitoring location precision indication may include the monitoring target information of the UE, monitoring level information of the UE, and the monitoring location precision information of the UE.

The location information receiving unit 92 is configured to obtain the location information of the UE when the UE executes a location update according to the TA list, for example, obtain the first location information (last visited TA) before the location update and the second location information (current TA) after the location update.

The location information processing unit 93 is configured to obtain location update information of the UE according to the location information obtained by the location information receiving unit 92 when the UE executes the location update; the location update information may include the moving direction, track, distance, and speed of the UE. For example, the location information processing unit 93 calculates the moving track, distance and speed of the UE according to the obtained location information before and after the location update.

In practice, with the location information receiving apparatus, the moving direction, distance, and speed of the monitoring target may be obtained and the monitoring precision may be set flexibly according to the required monitoring precision to improve the location precision of the monitoring target.

To sum up, in comparison with the prior art, a TA list of the UE is created according to a monitoring location precision indication in the embodiments of the present disclosure so that the monitoring location precision of a monitoring target may be set and thereby more accurate location information of the monitoring target may be obtained. For example, the TA list of the UE may include only one TA and the location precision of the UE is an individual TA. By obtaining the first location information before the location update and the second location information after the location update, the monitoring center knows the moving direction and distance of the monitoring target and further knows the moving track and speed of the monitoring target. Therefore, the embodiments of the present disclosure may meet the needs of various monitoring tasks. The disclose embodiments under the present disclosure may be implemented by a software product. The software product may be stored in a storage medium and incorporates several instructions that instruct a processor to execute the corresponding monitoring methods.

Although the present disclosure has been described through exemplary embodiments, the disclosure is not limited to such embodiments. It is apparent that those skilled in the art can make various modifications and variations to the disclosure without departing from the spirit and scope of the present disclosure. The disclosure is intended to cover the modifications and variations provided that they fall within the scope of protection defined by the claims or their equivalents.

What is claimed is:

1. A location monitoring method, comprising:
creating, in an evolved packet system (EPS), a tracking area (TA) list for a user equipment (UE) according to an intercept precision indication and sending the TA list to the UE, wherein the intercept precision indication comprises intercept location precision information of the UE which is an intercepting distance, and the creating comprises: according to the intercept location precision information of the UE, choosing number of TAs corresponding to the intercept location precision information and creating the TA list for the UE according to the chosen number and according to a current TA of the UE and surrounding TA;

obtaining, first location information of the UE initiating a location update before the location update and second location information after the location update, wherein the location update is initiated by the UE when the UE detects that the current TA is not in the TA list, or the location update is a periodic location update initiated by the UE; and reporting the first location information and the second location information to an intercept center.

2. The method of claim 1, wherein:

when the location update is performed by the UE when the UE detects that the current TA is not in the TA list, the first location information comprises an ID of a TA where the UE is located before the UE moves and the second location information comprises an ID of a TA where the UE is located after the move.

3. The method of claim 1 further comprising:

receiving a location update request of the UE; and wherein obtaining the first location information of the UE performing the location update before the location update and the second location information after the location update comprises:

obtaining the first location information before the location update and the second location information after the location update carried in the location update request received from the UE.

4. The method of claim 1, wherein the step of creating the TA list for the UE according to the intercept precision indication is executed after initiating a UE identity reallocation procedure or receiving a location update request sent by the UE.

5. The method of claim 1, further comprising: obtaining the intercept precision indication.

6. The method of claim 5, wherein the step of obtaining the intercept precision indication comprises:

interacting with a home subscriber server (HSS) that stores the intercept precision indication of the UE to obtain the intercept precision indication of the UE; or interacting with the intercept center to obtain the intercept precision indication of the UE; or obtaining the intercept precision indication of the UE preconfigured in local data.

7. A location information obtaining apparatus applied in an evolved packet system (EPS) comprising:

a listing unit, configured to create a tracking area (TA) list for user equipment (UE) according to an intercept precision indication and send the TA list to the UE, wherein the intercept precision indication comprises intercept location precision information of the UE which is an intercepting distance, and the listing unit is configured to choose number of TAs corresponding to the intercept location precision information according to the intercept location precision information of the UE, and create the TA list for the UE according to the chosen number and according to a current TA of the UE and surrounding TA;

a location information obtaining unit, configured to obtain first location information of the UE initiating a location update before the location update and second location information after the location update, wherein the location update is initiated by the UE when the UE detects that the current TA is not in the TA list, or the location update is a periodic location update initiated by the UE; and a reporting unit, configured to report the first location information and the second location information obtained by the location information obtaining unit to an intercept center.

8. The apparatus of claim 7, further comprising:

a receiving unit, configured to receive a location update request of the UE; and the location information obtaining unit, configured to obtain the first location information and the second location information carried in the location update request after the receiving unit receives the location update request of the UE.

9. The apparatus of claim 7, further comprising:

a precision indication obtaining unit, configured to obtain the intercept precision indication and send the intercept precision indication to the listing unit.

* * * * *